March 21, 1961 A. J. CARR, JR 2,976,491

CIRCUIT RESPONSIVE TO AMPLITUDE AND PHASE MODULATED WAVE AND CONVERTING AMPLITUDE MODULATION INTO SECONDARY PHASE MODULATION

Filed May 21, 1958 2 Sheets-Sheet 1

$V2 = E \pm jF$

INVENTOR
AMOS J. CARR, JR
BY H. Vincent Harsha
ATTORNEY

March 21, 1961 A. J. CARR, JR 2,976,491

CIRCUIT RESPONSIVE TO AMPLITUDE AND PHASE MODULATED WAVE AND CONVERTING AMPLITUDE MODULATION INTO SECONDARY PHASE MODULATION

Filed May 21, 1958 2 Sheets-Sheet 2

INVENTOR
AMOS J. CARR, JR
BY R. Vincent Harsha
ATTORNEY

United States Patent Office 2,976,491

Patented Mar. 21, 1961

2,976,491

CIRCUIT RESPONSIVE TO AMPLITUDE AND PHASE MODULATED WAVE AND CONVERTING AMPLITUDE MODULATION INTO SECONDARY PHASE MODULATION

Amos J. Carr, Jr., Lexington, Mass., assignor to Raytheon Company, a corporation of Delaware Filed May 21, 1958, Ser. No. 736,908

10 Claims. (Cl. 328—155)

The present invention relates in general to phase modulation data processing systems and more particularly concerns novel apparatus for providing an electrical signal having a primary phase modulation related to the phase of an input electrical signal together with a secondary phase modulation representing the magnitude and sign of the deviation of the amplitude of the input signal from some predetermined reference.

Although the circuits disclosed herein are of general utility in the phase modulation art, it will be convenient to discuss the invention with special emphasis on its application to an electronic machine tool control which directs a cutting tool along the path prescribed by a two-dimensional template, as for example, that disclosed in Patents 2,627,055 and 2,753,500 and in a paper by A. J. Carr, Jr., appearing in the Transactions of the Institute of Radio Engineers, Professional Group on Industrial Electronics, March 1956. In such apparatus, a follower stylus is brought into contact with a template which represents the contour to be machined. Once contact is established between the follower stylus and the template, the stylus is caused to assume a predetermined deflection and to maintain that deflection while it moves tangentially along the template at a constant tracing speed, carrying the tool with it to duplicate in the workpiece the contour of the template. As disclosed in the aforementioned patents and publication, stylus deflection is first resolved electrically into its components to provide alternating current, X and Y signals. These are in turn re-combined by a vector adder into a single signal which may be thought of as an electrical vector whose magnitude represents stylus deflection and whose phase displacement from a selected reference represents radial direction of stylus deflection. After appropriate modification this single vector serves to provide two X and Y signal components, this time represented by two D.-C. voltages whose magnitudes are always related as the sine and cosine of an angle determined by the instantaneous slope of the template contour at the point of stylus contact. D.-C. motors are operated from these control signals through thyratron circuits, for example, driving X and Y lead screws of the machine, thus positioning the machine element on which the follower and cutting tool are both rigidly mounted.

The present phase modulator permits marked simplification of the circuits for transferring data in electronic machine tool control systems. Generally speaking, a signal representing the combined X and Y vectors is accepted as an input and by use of the techniques herein disclosed an output signal is derived having the same phase as the input for some predesignated value of the input signal, while for other magnitudes thereof the output is additionally phase modulated as a function of the deviation of the magnitude of the input signal from the predesignated reference level. The sense of this secondary phase modulation depends on whether the magnitude of the input signal is greater or less than that of the selected reference. The resulting phase of the output signal thus constitutes the data being transmitted to the subsequent electrical and mechanical controls.

It is therefore a primary object of the present invention to provide a novel phase modulator wherein an output signal is derived by modifying the phase of an input signal in accordance with deviations in the amplitude of the latter from some internal reference magnitude.

Another object of the present invention is to provide a phase modulator wherein an amplitude reference is derived from the input signal itself.

Still another object of the present invention is to provide a phase modulator of generally simplified design which inherently minimizes the delay of information components transferred therethrough.

In one aspect of this invention the input signal, which may be of the character previously described wherein magnitude represents stylus deflection while relative phase represents raidal direction, is applied to a clipping circuit and filter to generate an electrical signal of identical frequency and substantially the same phase with a fixed, reference amplitude. This reference signal together with a fraction of the initial input signal are in turn applied to a summing amplifier whose output is then shifted 90° in phase to furnish a quadrature signal whose amplitude represents deviation of the input signal from the established reference. The latter signal is in turn vectorially added to the reference signal to provide the final system output which, as it will be shown, may be thought of as a new electrical vector whose phase differs from that of the input signal, in magnitude and sense, by an amount representative of the departure of the input electrical vector from the magnitude of the internally established reference. Through the use of these techniques, which represent a simplification from the standpoint of number of components required and complexity of adjustments, not only may cost be reduced in machine tool control systems, but reliability and accuracy may be materially enhanced.

Other objects, advantages and features of the present invention will become apparent from the following specification when taken in connection with the accompanying drawings in which.

Figure 1:
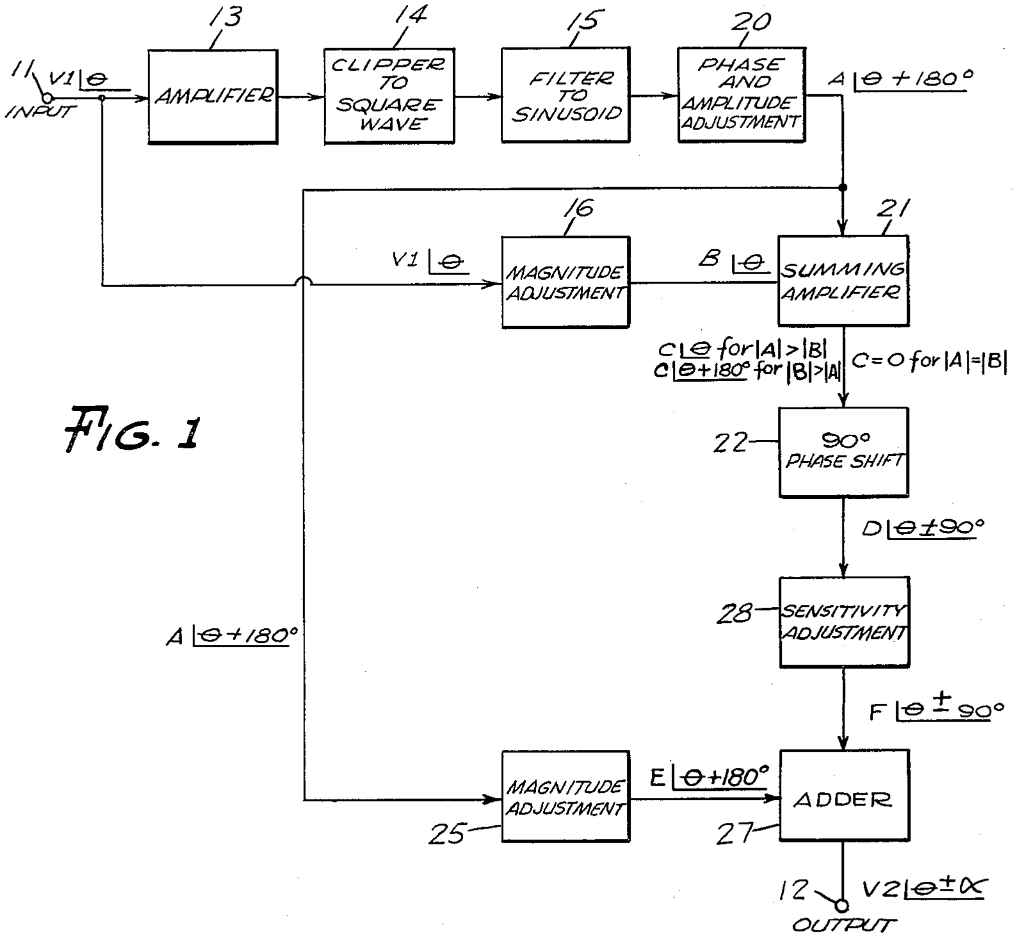
Fig. 1 is a block diagram generally illustrating the logical interconnection of circuits for providing the desired phase modulated output from an input signal.

With reference now to the drawing and more particularly Fig. 1 thereof, a block diagram of the novel phase modulator is illustrated which accepts an input electrical signal at terminal 11 and provides an output electrical signal at terminal 12 of identical frequency and of a phase characteristic of first, the input signal phase, and second, the relationship of the amplitude of the input to an internally established amplitude reference.

Although the frequency of the input signal is not critical to performance of machine tool controls of the type disclosed in the aforementioned patent application, it is most convenient to use the 60 cycle power line for excitation. In the discussion which follows, however, to indicate the generality of the apparatus, the input signal will be designated as an electrical vector $V1\underline{/\theta}$. Again with reference to the electronic machine tool control hereinabove discussed, the amplitude of the input, namely, $|V1|$ may represent stylus deflection from some reference point while the phase angle $\theta$ may represent the radial direction of stylus deflection.

To establish an amplitude reference for the system, the input signal $V1/\underline{\theta}$ is applied directly from terminal 11 to a high gain amplifier 13 whose output is in turn applied to a conventional clipper circuit 14 which by removing both positive and negative peaks converts the amplified input signal to a square wave of corresponding frequency. By setting the clipping level of positive and negative peaks in clipper circuit 14, the peak-to-peak amplitude of the output square wave may be precisely adjusted to some fixed value for the amplitudes of V1 above some minimum value.

The square wave output is applied to filter 15 which restores the signal to a sinusoid having the peak-to-peak amplitude set by clipper circuit 14.

Generally speaking, the phase of the vector output of filter 15 will depart from that of input vector V1, namely, the arbitrary phase angle $\theta$, first by 180° due to amplification, and further, due to inherent internal phase shifts of the circuits 13, 14 and 15. These internal phase shifts may be compensated for and the amplitude adjusted by phase and amplitude adjustment circuit 20. As a result, the output of the latter circuit may be vectorially designated as $A/\underline{\theta+180°}$, that is, a vector in phase opposition to the input $V1/\underline{\theta}$.

It will be observed that the input electrical vector designated as $V1/\underline{\theta}$ is also applied to magnitude adjustment circuit 16, which may simply be a resistance voltage divider. The vector output of the magnitude adjustment circuit 16 is designated as $B/\underline{\theta}$; indicating an adjustment in amplitude without the phase shift.

Basically, magnitude adjustment 16 permits the control of the amplitude of the input signal so that the vector $B/\underline{\theta}$ may be made equal in amplitude to the electrical signal represented by the vector $A/\underline{\theta+180°}$ for a predetermined magnitude of the input vector $V1/\underline{\theta}$. More specifically, in the machine tool control application discussed earlier, the amplitude $|B|$ may be made equal to the amplitude $|A|$ for some reference deflection of the follower stylus.

As illustrated, the amplitude reference vector $A/\underline{\theta+180°}$ and the amplitude adjusted input vector $B/\underline{\theta}$ are simultaneously applied to a summing amplifier 21.

The amplitude of the vector output of summing amplifier 21 is designated as $|C|$, and at this point it is appropriate to consider the phase of this signal. Thus considering the 180° phase reversal in summing amplifier 21, when $|A|$ is greater than $|B|$ the output vector C will be at the phase angle $\theta$, while when $|B|$ is greater than $|A|$ the relative phase angle of vector C will be $\theta+180°$. Evidently, when $|A|$ equals $|B|$, the vector C will reduce to zero.

The electrical signal designated by vector C is applied from the output of summing amplifier 21 to a 90° phase shift network 22 which may add ±90°. For convenience in further description, it will be assumed that a +90° shift is compatible with system requirements, hence the output of phase shift network 22 may be vectorially designated as $D/\underline{\theta\pm90°}$, the sense of the 90° phase shift being determined by the relative amplitudes $|A|$ and $|B|$.

Returning now to the output of phase adjustment circuit 20, the signal $A/\underline{\theta+180°}$ is applied in parallel to a magnitude adjustment circuit 25, the purpose of which will be disclosed below, to yield a vector $E/\underline{\theta+180°}$ which is combined with the previously described signal $D/\underline{\theta\pm90°}$, modified by sensitivity amplitude adjustment 28 to $F/\underline{\theta\pm90°}$, in a vector adder circuit 27. The output of adder 27 appears as the output signal at terminal 12 and is designated by the vector $V2/\underline{\theta\pm\alpha}$.

Figure 2:
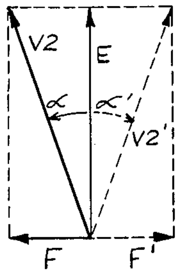
Fig. 2 is a vector diagram illustrating phase relationship of electrical signals which are combined to provide the output signal in the apparatus disclosed in Fig. 1.

In Fig. 2 the significance of the vector summation performed in adder 27 is illustrated graphically. Thus vector E represents the fixed output of magnitude adjustment circuit 25. The vector F which appears at the output of sensitivity adjustment 28 is illustrated as combined with vector E to yield the final vector V2 whose phase differs from that of vector E by the angle $\alpha$. When the sense of the vector F is reversed as shown at F′, its combination with vector E appears as vector V2′ displaced from E by the angle $\alpha'$.

It is now appropriate to examine the information content of the vector output V2. It will be observed that this vector includes the phase angle $\theta$ of the input signal V1 together with a secondary phase displacement $\alpha$ which depends upon the magnitude and sense of the difference between the input vector, adjusted to $B/\underline{\theta}$, and the internally established reference vector $A/\underline{\theta+180°}$. Clearly, if these two vectors are equal, the vectors C, D and F will all be zero, and the output will represent the internal reference A modified by the magnitude adjustment 25 to the vector E. When dissimilar, the amplitude data representing the difference in magnitude between input signal V1 and the internally fixed reference A will appear at the output as a secondary phase modulation in the form of the angle $\alpha$.

From Figs. 1 and 2 it may be seen that the function of magnitude adjustment 28 is to permit altering the sensitivity of the system, while magnitude adjustment 25 controls the amplitude of vector E for optimum V2 amplitude when F is zero. Thus, the smaller the vector F, the smaller will be the phase shift $\alpha$ for a given vector E.

Figure 3:
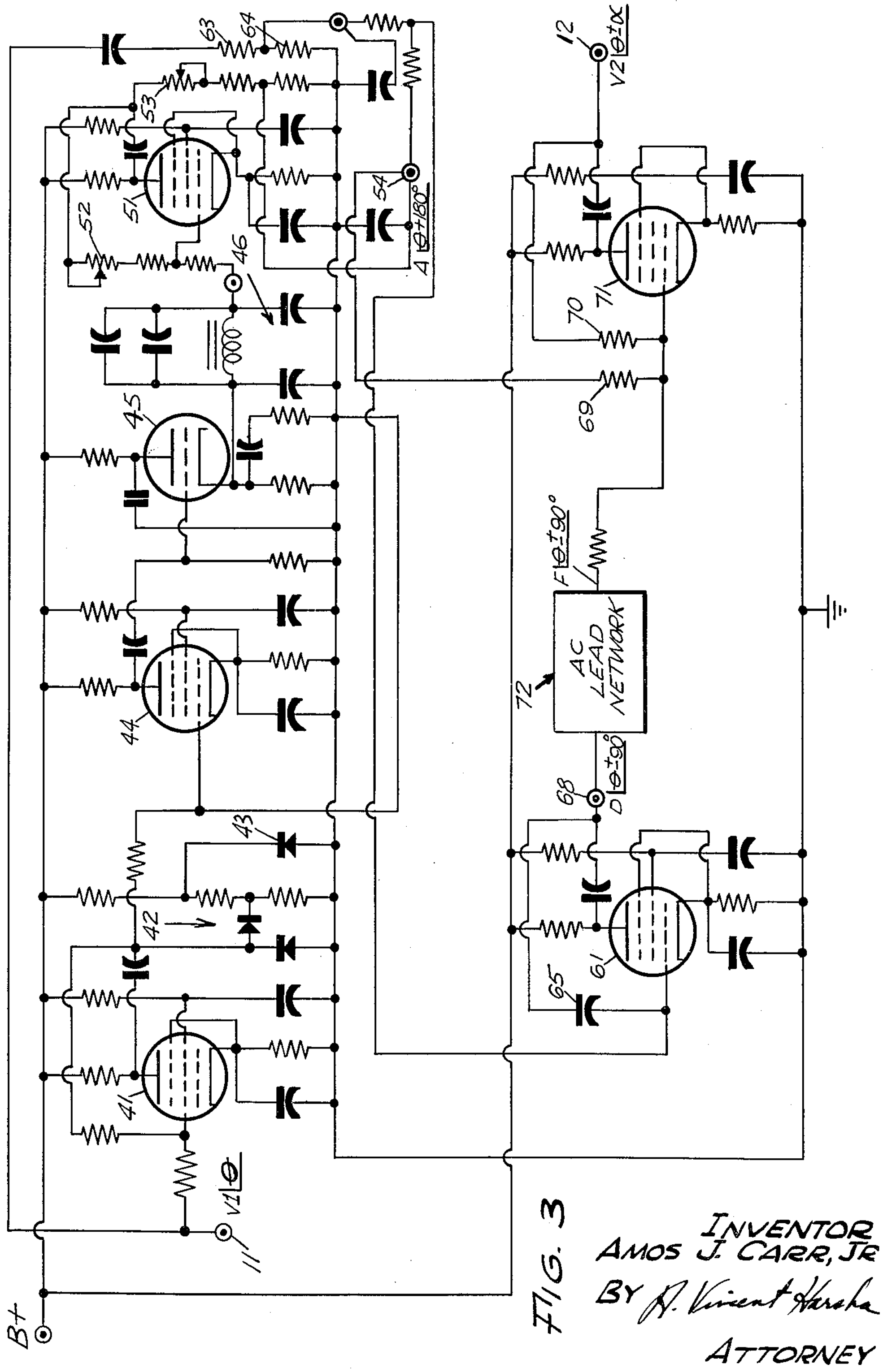
Fig. 3 is a schematic diagram of a circuit embodiment of the phase modulator illustrated diagrammatically in Fig. 1.

Fig. 3 is a schematic circuit diagram of a phase modulator embodying the concepts generally disclosed in the block diagram of Fig. 1. The input signal $V1/\underline{\theta}$ is applied at terminal 11 and coupled to the control grid of a pentode amplifier 41, the output of which is applied to a clipper circuit 42 whose level is set by Zener diode 43. The resultant square wave is in turn applied to amplifier 44 and cathode follower 45, a feedback loop 46 being included to improve circuit gain stability.

The square wave output of cathode follower 45 is at this point applied to a "notch" filter 46 which functions to restore the signal to a sine wave at a level determined by clipper circuit 42. The filtered signal is applied to pentode amplifier 51; the signal magnitude being controlled by potentiometer 52 while the signal phase is adjusted by potentiometer 53. In this manner the vector $A/\underline{\theta+180°}$ is derived at terminal 54.

A summing amplifier 61 is simultaneously energized by vector A appearing at terminal 54 and an electrical signal derived from the input terminal 11 through a magnitude adujstment circuit constituted of resistors 63 and 64. Capacitor 65 serves to introduce a 90° phase shift in the output and accordingly an electrical signal as represented by the vector $D/\underline{\theta\pm90°}$ appears at terminal 68.

It will be observed that the electrical signal represented by the D vector is passed through an A.C. lead network 72 as may be required for anti-hunt stabilization in a tool control system being controlled by the output of this phase modulator. The output of A.C. lead network 72 is the vector $F/\underline{\theta\pm90°}$ discussed earlier in connection with Fig. 1.

The electrical signals represented by the vector $A/\underline{\theta+180°}$, and $F/\underline{\theta\pm90°}$, are applied to the vector adder, pentode 71. The output of pentode 71 appears at terminal 12 and constitutes the phase modulated signal represented by the electrical vector $V2/\underline{\theta\pm\alpha}$, as described in Fig. 1.

This electrical signal, and the phase modulation data contained therein may now be applied to data transmission and interpretation apparatus appropriate to the particular application. In electronic machine tool control as above cited, this data may ultimately be used to control the lead screws of a contour cutter or the like.

Inasmuch as numerous modifications and departures of the apparatus and techniques herein disclosed may now become apparent to those skilled in this art, the invention is to be construed only by the spirit and scope of the appended claims.

What is claimed is:

1. Phase modulation apparatus comprising, means responsive to an input signal for providing a reference signal of related phase and fixed amplitude, means for combining said input and reference signals to provide an intermediate signal, and means for combining said reference signal with a phase shifted portion of said intermediate signal to derive a phase modulated output.

2. Phase modulation apparatus comprising, means responsive to an input signal for providing a reference signal of related phase and substantially constant amplitude, means for deriving an intermediate signal having an amplitude related to the difference between said input and reference signal amplitudes, means for shifting the phase of said intermediate signal, and means for combining said reference signal and said phase shifted intermediate signal to derive a phase modulated output.

3. Phase modulation apparatus comprising, means responsive to an input signal for providing a reference signal of related phase and substantially constant amplitude, means for deriving an intermediate signal having an amplitude and phase related to the difference between said input and reference signal amplitudes, and means for combining said reference signal with a quadrature component of said intermediate signal to provide a phase modulated output.

4. Phase modulation apparatus comprising, means responsive to an input signal for providing a reference signal of opposite phase and substantially constant amplitude, a vector summing circuit for additively combining said reference signal and a portion of said input signal to provide an intermediate signal, means for shifting the phase of said intermediate signal, and a vector summing circuit for additively combining said phase shifted intermediate signal and said reference signal to derive a phase modulated output.

5. Phase modulation apparatus comprising, means responsive to an input signal for providing a reference signal of opposite phase and substantially constant amplitude, a vector summing circuit for additively combining said reference signal and a portion of said input signal to provide an intermediate signal having one phase for input signal amplitudes greater than said reference signal amplitude and opposite phase for input signal amplitudes less than said reference signal amplitude, means for shifting the phase of said reference signal by ninety degrees, and a vector summing circuit for additively combining a portion of said phase shifted intermediate signal and a portion of said reference signal to derive a phase modulated output.

6. Phase modulation apparatus comprising, an amplifier-clipper circuit responsive to an input sinusoidal signal for providing a square signal of predetermined peak-to-peak amplitude, a filter responsive to said square wave signal for providing a sinusoidal signal of substantially constant amplitude, means for adjusting the phase of said sinusoidal signal to provide a reference signal of substantially constant amplitude having a phase opposite that of said input signal, a vector summing circuit for additively combining a portion of said input signal and said reference signal to provide an intermediate signal in phase with said input signal for input signal amplitudes less than said reference signal amplitude and of opposite phase for input signal amplitudes greater than said reference signal amplitude, and means for additively combining a quadrature component of said intermediate signal and a portion of said reference signal to derive an output signal having a phase relative to the phase of said input signal whose magnitude and sense is indicative of the amplitude of said input signal relative to the amplitude of said reference signal.

7. Phase modulation apparatus in accordance with claim 6 and including a sensitivity control for adjusting the amplitude of said quadrature component of said intermediate signal additively combined with said portion of said reference signal for modifying the extent of phase modulation of said output signal for a predetermined amplitude difference between said intermediate signal and said reference signal.

8. Phase modulation apparatus in accordance with claim 7 and including means for adjusting the amplitude of said portion of said reference signal additively combined with said quadrature component of said intermediate signal for establishing the amplitude of said output signal under conditions of zero intermediate signal.

9. Phase modulation apparatus for providing an output signal having a primary phase modulation related to the phase of an input signal and a secondary phase modulation representing the magnitude and sense of the deviation of the amplitude of said input signal from the amplitude of a substantially constant reference signal comprising, means responsive to said input signal for providing said reference signal, means for combining a portion of said input signal and said reference signal to provide an intermediate signal in phase with said input signal for deviations of amplitude of said input signal from said reference signal amplitude in one sense and opposite in phase to said input signal for deviations in the opposite sense, and means for additively combining a quadrature component of said intermediate signal with a portion of said reference signal to provide said phase modulated output signal.

10. Phase modulation apparatus for providing an output signal having a primary phase modulation related to the phase of an input signal and a secondary phase modulation representing the magnitude and sense of the deviation of the amplitude of said input signal from the amplitude of a substantially constant reference signal comprising, an amplifier-clipper circuit responsive to said input signal for providing a square wave of like frequency having predetermined peak-to-peak amplitude, a filter responsive to said square wave for providing a sinusoidal signal of substantially constant amplitude, means for adjusting the phase of said sinusoidal signal to provide said reference signal in a phase opposite that of said input signal, a vector summing circuit for additively combining a portion of said input signal and said reference signal to provide an intermediate signal in phase with said input signal for input signal amplitudes less than reference signal and of opposite phase to said input signal for input signal amplitudes of said input signal greater than said reference signal, means for shifting the phase of said intermediate signal by ninety degrees, and a vector summing circuit for additively combining a selected fraction of said reference signal with a fraction of said phase shifted intermediate signal to provide said phase modulated output signal, said output signal being in phase with said input signal when said fraction of said phase shifted intermediate signal is zero, and out of phase with said input signal for all other values of said phase shifted intermediate signal.

References Cited in the file of this patent

UNITED STATES PATENTS

| | | |
|---|---|---|
| 1,964,522 | Lewis | June 26, 1934 |
| 2,831,975 | Catherall | Apr. 22, 1958 |
| 2,853,603 | Herold | Sept. 23, 1958 |